Jan. 6, 1931.  T. BRIEGEL  1,787,774

ELECTRICAL SLIP-IN CONNECTER

Filed Dec. 3, 1928

INVENTOR.
Theodore Briegel,
BY Walter N. Haskell,
his ATTORNEY

Patented Jan. 6, 1931

1,787,774

UNITED STATES PATENT OFFICE

THEODORE BRIEGEL, OF ROCK ISLAND, ILLINOIS

ELECTRICAL SLIP-IN CONNECTER

Application filed December 3, 1928. Serial No. 323,306.

My invention has reference to a slip-in connecter for electrical devices, and has for its purpose to increase the efficiency of such connecting devices and the ease of attachment thereof. The connecters referred to are of the type which are employed for uniting the end of a tube or conduit for electrical wires with a box or casing into which the wires lead, and which has generally been accomplished by means of a collar or short section of pipe attached to the conduit on the outside of the box and having a threaded end extending through an opening in the box, and provided on said end with a nut and locknut. The positioning of these on the inside of a box is not an easy operation, and calls for the use of pliers or a wrench, or both.

The chief purpose of the present invention is to provide a coupling device which can be manipulated entirely from the outside of the box, and with the help of a small screwdriver. A rigid connection with the box is formed, and the fastening parts are self-locking, so that they can not be accidentally displaced.

Another feature of the invention consists in the provision of a stop for the end of the conduit, to prevent the same from protruding into the box.

If the occasion requires, the connecter can be quickly disconnected from the box in which it is held, or from the end of the tubing.

The above-named, and other features and advantages of the invention will more fully appear from the following specification, reference being had to the accompanying drawings, in which.

Figure 1:
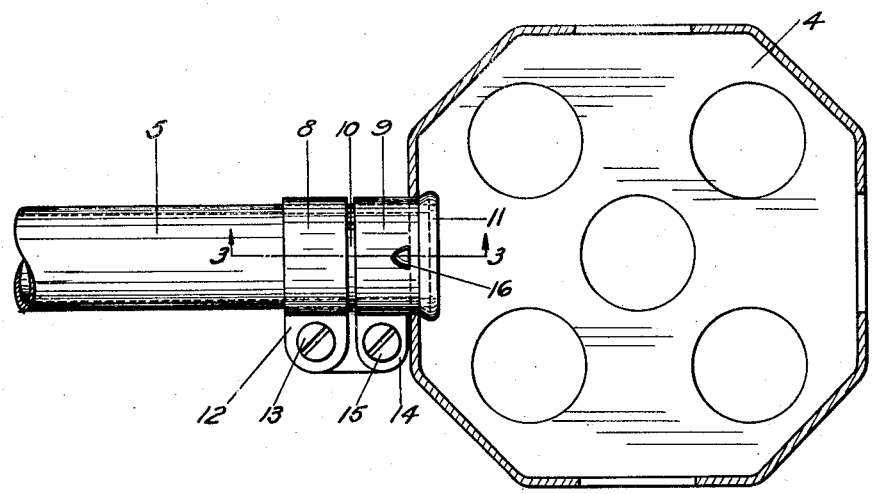
Fig. 1 is a plan view of the invention, as it appears when in use.
Figure 2:
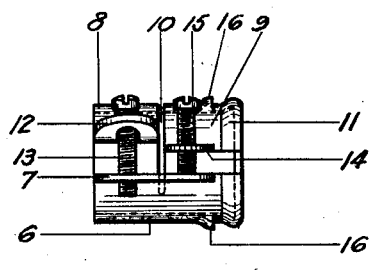
Fig. 2 is a front view thereof, detached.

The reference number 4 indicates a casing, or "knock-out box", such as are used for enclosing switches or other electrical devices, and which is or may be provided with openings to receive the end of a tube or conduit for electric wires, such as is shown at 5. These tubes are usually of a flexible character, and are frequently fitted with the wiring, as in the case of such devices which are known to the trade as "B. X." and "Romex". The connector consists of a body 6, of semi-tubular form, provided at its edge with an outstanding flange 7. Projected from the part 6 are semi-circular sections 8 and 9, separated by a slit 10, extending to the body portion 6. The outer end of the section 9 is provided with a rolled portion 11, forming a slight enlargement of the end of the section. The edge of the section 8 is formed into a lip 12, perforated to permit the free passage of a screw 13, the end of which is engaged by a threaded opening in the flange 7. The edge of the section 9 is similarly formed into a lip 14, having a threaded opening to receive a screw 15, the end of which bears against the flange 7.

Figure 3:
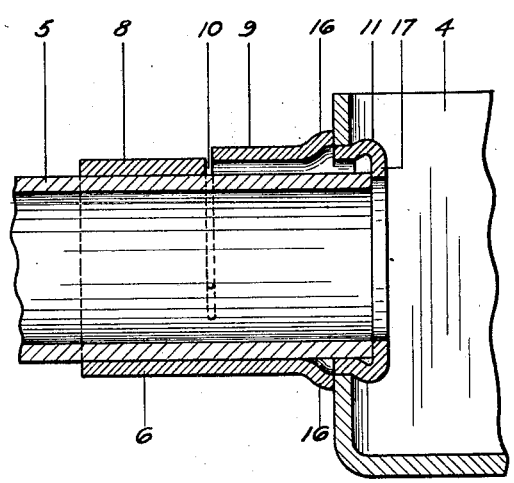
Fig. 3 is a longitudinal section on the line 3—3 of Fig. 1.

The connecter is preferably formed of malleable iron or steel, and when ready for use the part having the rolled end 11 is contracted until it will readily enter an opening in the wall of the box 4. Said part is then expanded by turning the screw 15 in a direction to separate the lip 14 and flange 7, until the rolled end 11 engages the inner face of the box 4, as shown in Figs. 1 and 3. The end of the tube 5 is then inserted in the connecter, and the ring 9 caused to engage such tube tightly by turning the screw 13 in a direction to draw the parts 7 and 12 toward each other. The end of the tube is then held tightly from release. Stops 16 are provided by striking portions of the section 9 outwardly, which stops limit the movement of the connecter into the opening in the box. It will be observed that the expansion of the end 9 and contraction of the end 8 can be accomplished with the use of a screw-driver, as hereinbefore mentioned, and at points convenient to reach with such screw-driver. When the part 9 is expanded the tension upon the screw 15 will be such as to act as a nut-lock, and prevent the accidental turning thereof. The same is true of the parts holding the screw 13, when the same are clamped upon the conduit.

In Fig. 3 the rolled end 11 of the connecter is shown turned inwardly into a flange 17, against which the end of the conduit 5 abuts, preventing further entrance of the conduit into the box 4.

It will be evident that other forms of detents can be used on the end of the part 9, in place of the rolled edge 11, and other changes can be made in the form and arrangement of the invention without departing from the spirit thereof. In case it is desired to disconnect the conduit from the box, this can be quickly done by turning the screw 15 outwardly, and reducing the diameter of the section 9 until the end 11 can be withdrawn through the opening in the box. By loosening the screw 13 the connecter can be released from the conduit.

What I claim, and desire to secure by Letters Patent, is:

An electrical connecter, comprising a clamp section and means for clamping the same on an electrical conduit, an expansible section integral with said clamp section and provided at its outer end with an enlarged portion turned inwardly to form a stop for the end of such conduit, and means for expanding said expansible section after being positioned in the opening in a box.

In testimony whereof I affix my signature.

THEODORE BRIEGEL.